United States Patent
Kupzak et al.

(10) Patent No.: US 12,209,939 B2
(45) Date of Patent: Jan. 28, 2025

(54) MATERIAL PROPERTY MEASUREMENT DEVICE WITH IMMERSION CONTROL

(71) Applicant: AMETEK, INC., Berwyn, PA (US)

(72) Inventors: Norman Kupzak, Dresden (DE); James A. Salomon, Providence, RI (US); Andre Stark, Radebeul (DE); Max Fredrich, Dresden (DE)

(73) Assignee: AMETEK, INC., Berwyn, PA (US)

( * ) Notice: Subject to any disclaimer, the term of this patent is extended or adjusted under 35 U.S.C. 154(b) by 141 days.

(21) Appl. No.: 17/955,939

(22) Filed: Sep. 29, 2022

(65) Prior Publication Data

US 2023/0093973 A1    Mar. 30, 2023

Related U.S. Application Data

(60) Provisional application No. 63/250,478, filed on Sep. 30, 2021.

(51) Int. Cl.
  *G01N 11/14*    (2006.01)
(52) U.S. Cl.
  CPC .................................... *G01N 11/14* (2013.01)
(58) Field of Classification Search
  CPC ...... G01N 11/14; G01N 11/162; G01F 23/00; G01F 23/0007; G01F 23/003; G01F 23/04
  USPC ............. 73/1.73, 53.01, 54.01, 54.28, 54.29, 73/54.32–54.34, 290 R, 291
  See application file for complete search history.

(56) References Cited

U.S. PATENT DOCUMENTS

| | | | |
|---|---|---|---|
| 3,285,058 A * | 11/1966 | Ostroot | G01N 11/14 73/54.35 |
| 5,773,712 A * | 6/1998 | Arvidsson | G01N 11/162 73/54.32 |
| 6,167,752 B1 | 1/2001 | Raffer | |
| 6,499,336 B1 | 12/2002 | Raffer | |
| 6,874,353 B2 | 4/2005 | Johnson et al. | |
| 8,499,619 B2 | 8/2013 | Raffer | |
| 2006/0075805 A1 | 4/2006 | Moonay | |

FOREIGN PATENT DOCUMENTS

DE        102012218814 A1    4/2014

OTHER PUBLICATIONS

Search Report and Written Opinion received in International Application No. PCT/US2022/045218, dated Feb. 2, 2023, 9 pages.

* cited by examiner

*Primary Examiner* — Robert R Raevis
(74) *Attorney, Agent, or Firm* — CM Law; Stephen J. Weed

(57) ABSTRACT

Devices, methods, and non-transitory computer readable media for measuring properties of a material are disclosed. A device is configured to automatically identify a property of the material such as a surface of the material as a measuring head of a spindle engages the material as the spindle is lowered. After the material surface is identified, the device is configured to automatically lower the measuring head to a predefined depth within the material with respect to the material surface. The device may measure another property of the material such as a rheological property with the measuring head at the predefined depth. The device may change the depth of the measuring head during measurement of the rheological property.

20 Claims, 10 Drawing Sheets

MATERIAL PROPERTY MEASUREMENT DEVICE WITH IMMERSION CONTROL

FIELD OF THE INVENTION

Examples of the present invention relate generally to devices for identifying a property of a material such as its surface or a rheological property (e.g., rheometers and viscometers) and, more specifically, to immersion control in such devices.

BACKGROUND OF THE INVENTION

Rheological property measurement devices such as rheometers and viscometers measure rheological properties of a material (e.g., a liquid, suspension, or slurry). A viscometer typically measures the viscosity of a material. A rheometer typically measures other rheological properties (e.g., yield, creep, elasticity, etc.) in addition to or instead of viscosity.

SUMMARY OF THE INVENTION

Devices, method, and instructions on non-transitory computer readable media for identifying one or more properties of a material are disclosed. An example device includes a spindle with a measuring head configured for immersion in the material, a rotational driver configured for attachment to and rotation of the spindle, a sensor coupled to the rotational driver, the sensor positioned to detect torque applied by the rotational driver to the spindle, a linear driver coupled (directly or indirectly) to the spindle, the linear driver configured to move the spindle between an upper position in which the measuring head is above the material surface and a lower position in which at least a portion of the measuring head is below the material surface, and a controller coupled to the sensor, the rotational driver, and the linear driver. The controller is configured to rotate the spindle via the rotational driver with the measuring head above the material surface, lower the spindle via the linear driver from the upper position toward the lower position, monitor the torque via the sensor as the spindle is lowered, detect engagement of the measuring head with the material surface responsive to the torque reaching a predefined trigger level, and identify the material surface based on the detected engagement of the measuring head with the material surface.

An example method includes rotating a spindle having a measuring head with the measuring head above a material surface, lowering the spindle from an upper position toward a lower position, monitoring torque applied to the spindle as the spindle is lowered, detecting engagement of the measuring head with the material surface responsive to the torque monitored reaching a predefined trigger level as the spindle is lowered, and identifying the material surface based on the detected engagement of the measuring head with the material surface.

An example non-transitory computer readable media includes instruction for identifying one or more properties of a material such as its surface or a rheological property. The instructions, when executed by a controller, configure the controller to rotate a spindle via a rotational driver with a measuring head of the spindle above the material surface, lower the spindle via a linear driver from an upper position toward a lower position, monitor torque applied to the spindle as the spindle is lowered, detect engagement of the measuring head with the material surface responsive to the torque reaching a predefined trigger level, and identify the material surface based on the detected engagement of the measuring head with the material surface.

BRIEF DESCRIPTION OF THE DRAWINGS

For the purpose of illustration, there are shown in the drawings various examples of the present invention. It should be understood, however, that the invention is not limited to the precise arrangements, dimensions, and instruments shown. Like numerals indicate like elements throughout the drawings. A letter designation may be added to reference numbers for multiple elements of the same or similar type. When referring to the elements collectively or a non-specific one of the elements the letter designation may be omitted. In the drawings.

DETAILED DESCRIPTION OF THE INVENTION

In one example, a device for identifying one or more properties of a material is provided. The device is configured to automatically identify a surface of the material as a measuring head of a spindle engages the material during lowering of the spindle. After identifying the material surface, the device automatically lowers the measuring head to a predefined depth within the material with respect to the material surface. The device may measure a rheological property with the measuring head at the predefined depth. The device may change the depth of the measuring head during measurement of the rheological property periodically or responsive to torque measurements within the material.

The device may be a rheometer or viscometer configured for testing yield, creep, and related properties of viscoelastic materials. Many different spindle geometries are commonly used by rheometers and viscometers to evaluate the behavior of pastes and solid dispersions, including paddles (e.g., spindle with vanes), pins and balls. These geometries are used to measure responses to induced shear stresses, such as yield and creep. The consistency of the measurement is aided by control of system variables, e.g., the immersion depth of the spindle measuring head into the material.

According to aspects of the disclosure described herein, the spindle (having a particular spindle geometry) is automatically immersed in the material to the correct depth with a vertical position control that controls a linear driver. The vertical position control lowers the spindle measuring head relative to the material. The surface of the material is detected by rotating the geometry slowly with a rotational position (or speed) control that controls a rotational driver and detecting a change in torque from a low baseline measurement as the spindle turns in the air to a higher torque as the surface of the material is engaged by the spindle.

Once the material surface is sensed, corrections can be applied to accurately estimate the surface of the material. This estimate is used, in turn, to control the immersion of the measurement head to the predefined depth, which is more consistent than an operator estimating the correct depth by eye.

Coupling the torque measurement and the rotational and linear (axial) displacement of the spindle also provides feedback for automatic measurements of non-homogeneous test materials.

Figure 1B:
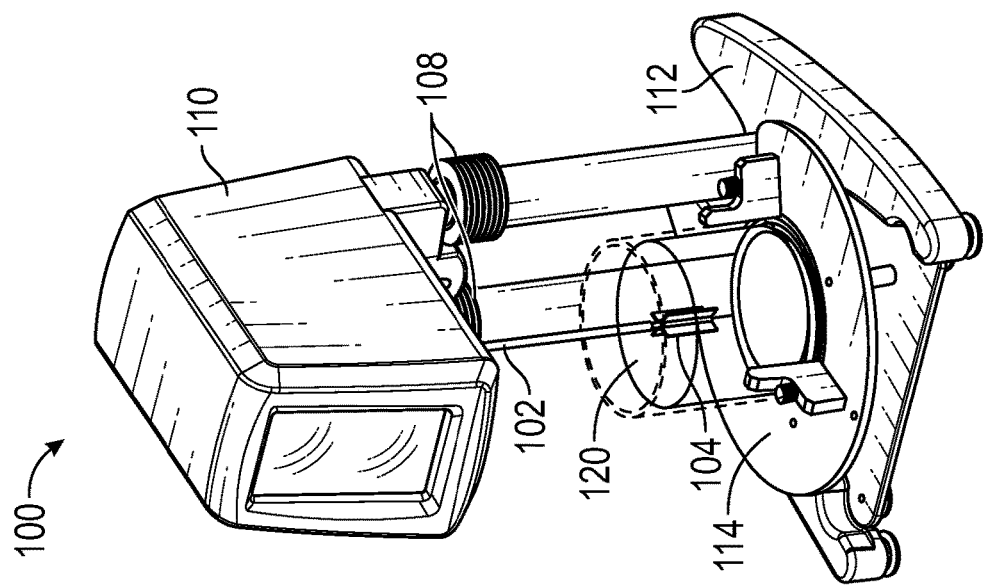
FIG. 1B is a perspective view of the device of FIG. 1A in a lowered state such that the measuring head is immersed in the material.
Figure 1A:
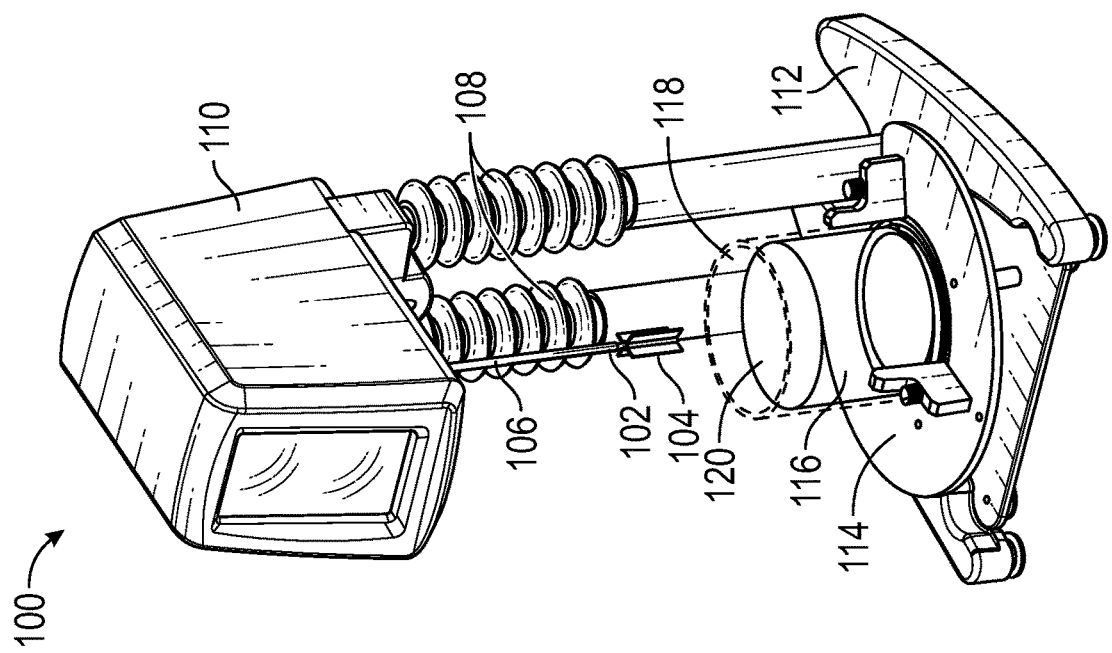
FIG. 1A is a perspective view of a device for identifying a property of a material such as its surface or a rheological property with an attached spindle in a raised state such that a measuring head of the spindle is above a surface of a material to be measured.

FIGS. 1A and 1B depict a device 100 for identifying one or more properties of a material such as detecting its surface or measuring a rheological property (e.g., a rheometer or a viscometer), in a raised state and a lowered state, respectively. The device 100 includes a spindle 102 having a measuring head 104 and a shaft 106 that attaches the measuring head 104 to a rotational driver 302 (FIG. 3A) in a head unit 110. During rheological measurements of a material 116, the rotational driver 302 selectively rotates the measuring head 104 within the material 116 being measured to determine one or more rheological properties (e.g., viscosity, creep, elasticity, yield, etc.).

A linear driver 108 is coupled between the head unit 110 and a base 112 of the device 100. The linear driver 108 raises and lowers the head unit 110 with respect to the base 112, which supports a container 118 holding the material 116 that is positioned on a support 114. Moving the head unit 110 moves the spindle 102 with respect to a surface 120 of the material 116. In the raised state of the device 100 (FIG. 1A), the measuring head 104 of the spindle 102 is above the surface 120 and in the lowered state of the device 100 (FIG. 1B), the measuring head 104 of the spindle 102 is at least partially below the surface 120 of the material 116 to measure a rheological property of the material 116. Although the illustrated linear driver 108 is indirectly coupled to the spindle 102 through the head unit 110 to raise and lower the measuring head 104, in other examples the linear driver 108 may be incorporated into the head unit 110.

Figure 2A:
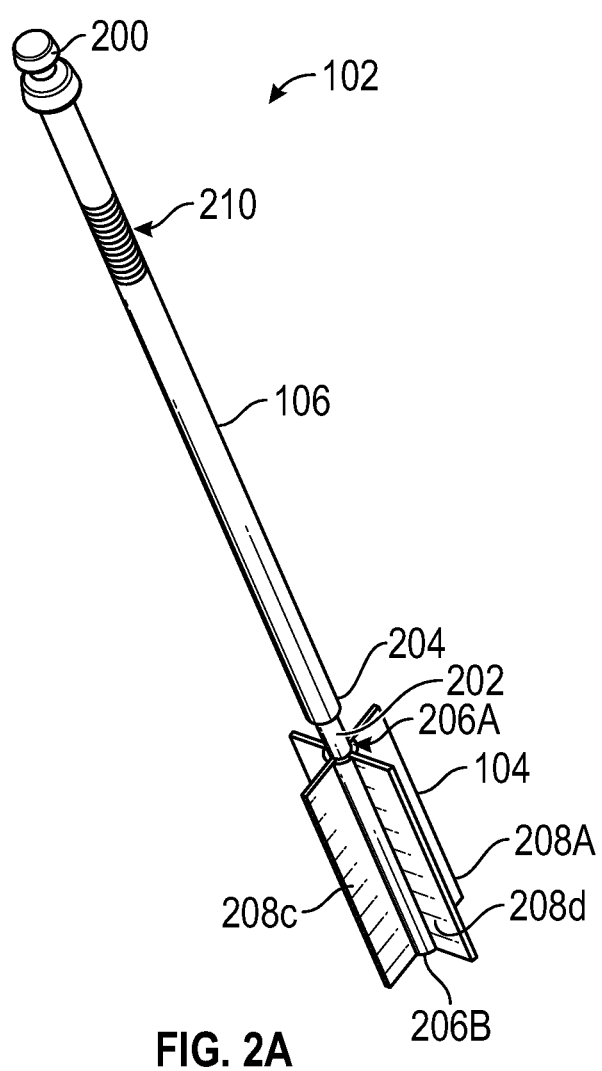
FIG. 2A is a perspective side view of the spindle with measuring head of FIG. 1A.

FIG. 2A depicts the spindle 102 of the device 100. The shaft 106 of the spindle 102 is attached to the measuring head 104 on one end and includes a coupler 200 on the other end. The coupler 202 is configured to mate with a corresponding coupler (not shown) of the rotational driver 302 (FIG. 3A) to secure the spindle 102 to the head unit 110. The coupler 202 and corresponding coupler may be secure mechanically, magnetically, or a combination thereof. The measuring head 104 has a top 206A and a bottom 206B. The spindle 102 has an intermediate shaft portion 202 positioned between an end 204 of a main portion of the spindle 102 and the top 206A of the measuring head 104.

The measuring head includes multiple fins 208 (fins 208a-d in the illustrated example) spaced equidistantly around a cylindrical spindle that is coaxial with the shaft 106. In one example, during rheological property measurements, the measuring head 104 is positioned below the surface 120 of the material 116 such that the intermediate shaft portion 202 coincides with the surface 120. The spindle 102 additionally includes an indicator (e.g., a visual indicator in the form of a barcode 210 or a magnetic indicator) positioned on or in the spindle 102. The barcode 210 represents one or more reference value that correspond to various features of the spindle, e.g., type of measurement head, dimensions of the measurement head (e.g., length from coupler 200 to measurement head bottom 206B), the predefined depth to which the measuring head 104 is to be immersed below the material surface, etc. A magnetic indicator may store similar information in magnetic form. The features of the spindle may be stored in a lookup table in memory, indexed by the reference value.

Figure 2B:
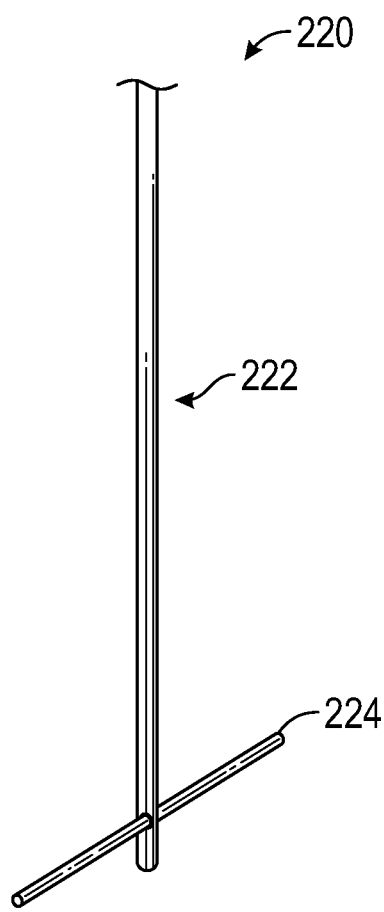
FIG. 2B is a perspective side view of another spindle with measure head for use with the device of FIG. 1A.

Other types of spindles 102 may be used such as the T-shaped spindle 220 depicted in FIG. 2B. The T-shaped spindle 220 includes a shaft 222 and a cross pin 224 adjacent the end of the shaft 222 to form a "T."

Figure 3A:
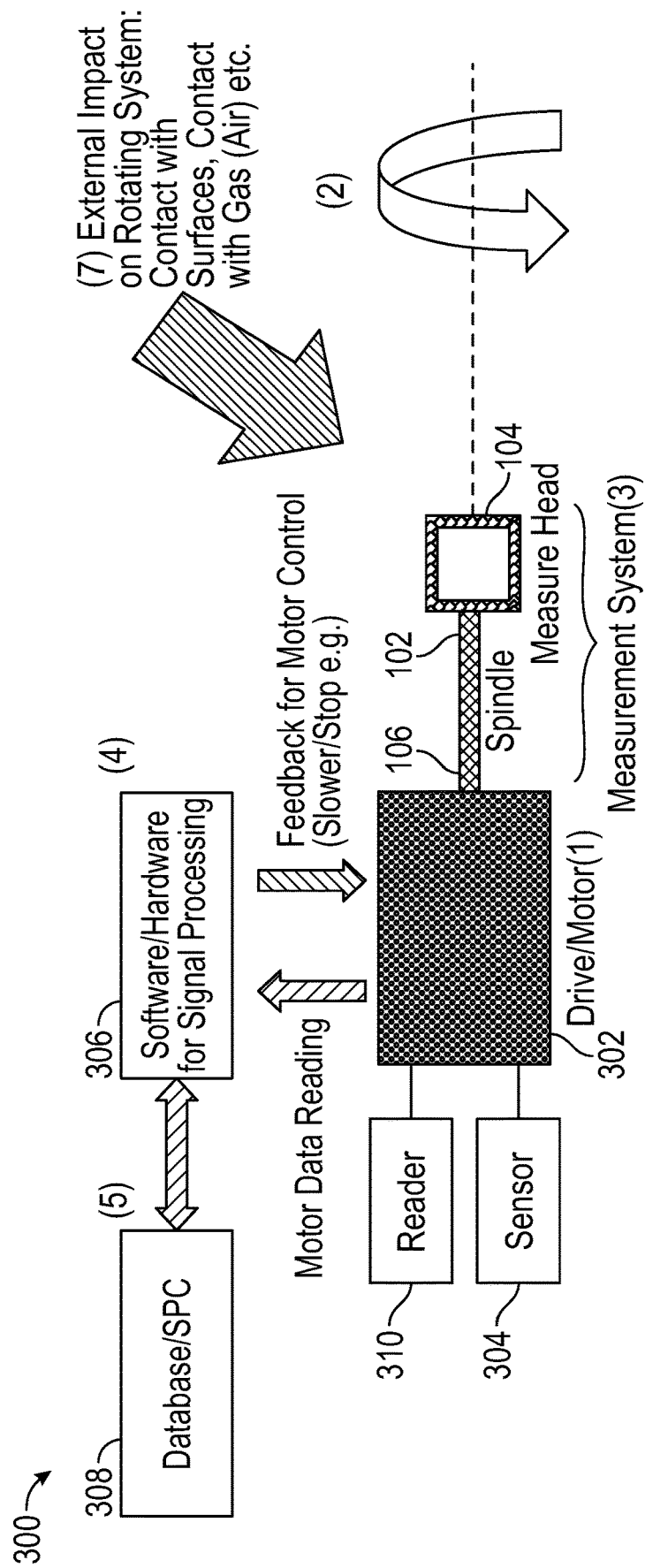
FIG. 3A is a block diagram of material property identification system.

FIG. 3A depicts a block diagram of an example material property identification system 300. The material property identification system 300 includes a motor 302. The motor 302 includes a linear drive motor for linear/axial movement of the spindle 102 and a rotational drive motor for rotational movement of the spindle 102 and measuring head 104. In an example, a controller, a linear drive module, and a rotational drive module are embodied in hardware and software 306. A linear driver (comprising the linear drive module and the linear drive motor), under control of the controller, selectively controls the linear/axial movement of the spindle 102. A rotational driver (comprising the rotational drive module and the rotational drive motor), under control of the controller, selectively controls the rotational movement of the spindle 102.

The material property identification system 300 includes one or more sensors 304. The sensors 304 may be configured to detect torque (e.g., based on speed and position) experienced by the drive motor 302 and orientation of the device 100. In one example, the sensors 304 include a torque sensor for measuring torque experienced by the motor 302 and an orientation sensor of detecting orientation of the device 100. A suitable torque sensor is a current sensor that is configured and positioned to measure current drawn by the motor (which is correlated to torque). A suitable orientation sensor is a micro electrical mechanical system (MEMS) based 3D accelerometer that measures angle and rate of angular change on three axes (x, y, z) for use in monitoring and evaluating orientation of the device 100. The sensors 304 may be positioned within the head unit or at another location of the device 100.

In use, the rotational driver rotates the spindle 102 with a defined velocity. The hardware and software 306 (e.g., responsive to input from sensor 304) measure torque applied to the spindle 102 to maintain the defined velocity and monitor the measured torque (e.g., using database 308) to detect deviations in torque. Detected deviations in torque caused by external impacts trigger desired actions, e.g., material surface detection, stop or slow spindle, move spindle up or down, etc. A reader 310 such as a barcode reader or magnetic reader reads indicators (e.g., visual or magnetic) on or associated with the spindle 102 to gather information (e.g., reference values representing or associated with spindle dimensions, measuring head type, preferred immersion depth, etc.).

Figure 3B:
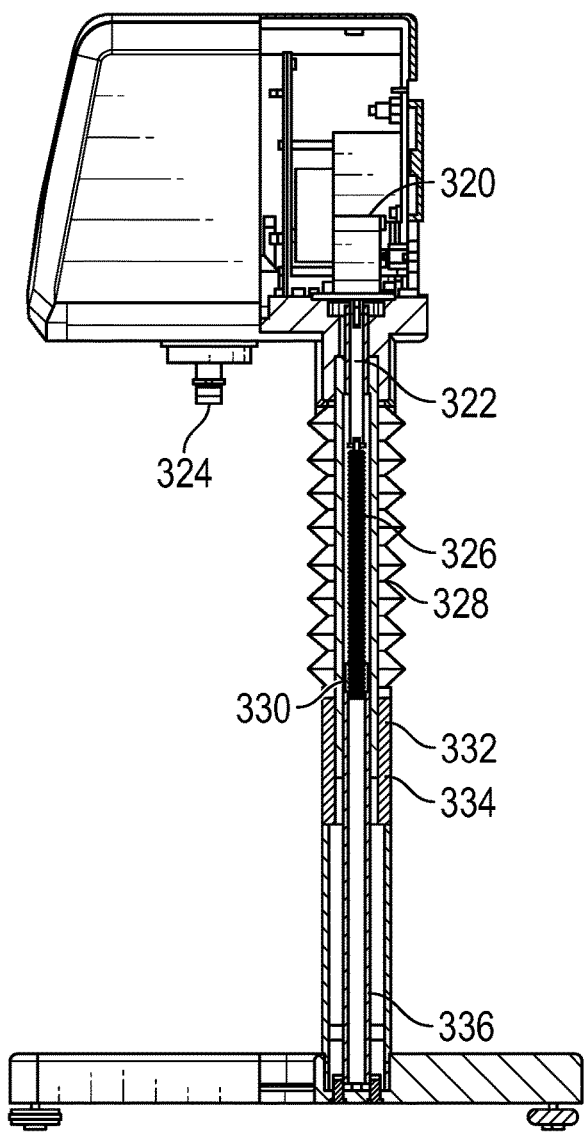
FIGS. 3B and 3C are respective front and side partial cutaway views of the device of FIG. 1A.
Figure 3C:
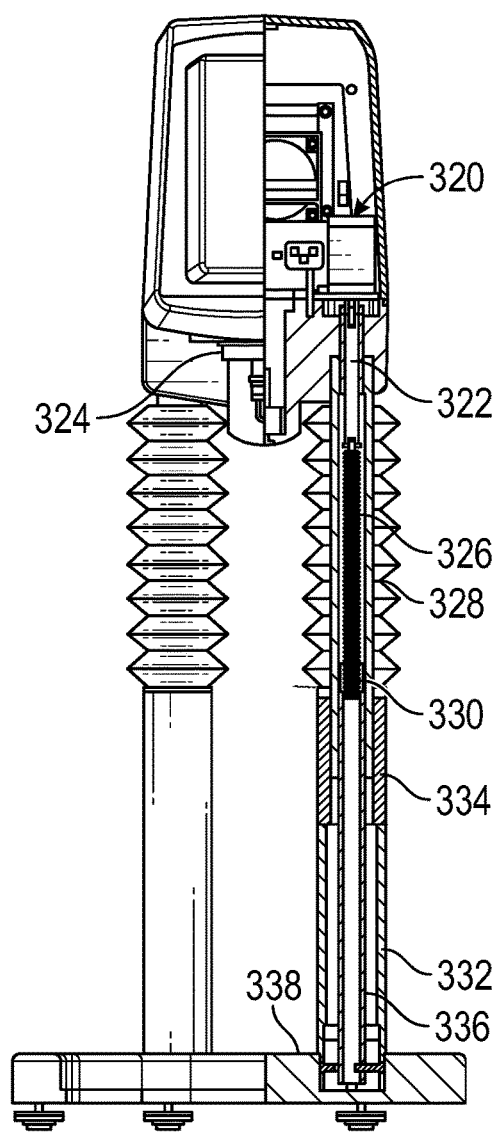

FIGS. 3B and 3C depict a partial cutaway view of the device 100 in which the right half (FIG. 3B) and back half (FIG. 3C) are partly cutaway to reveal the inner components of a support leg used to raise and lower the head unit 110 with respect to the base 112. A step motor 320 (under control of the hardware and software 306; FIG. 3A) rotates a coupler 322 that couples the step motor 320 to a lead screw 326. The lead screw 326 turns within a lead screw nut 330 that is fixed to a hollow inner tube 336. A brush motor 324 turns the spindle/measurement geometry.

The brush motor 324 is one example of a rotational drive that turns the spindle/measurement geometry. In one example, to detect torque, a current sensor senses current drawn by the brush motor 324. The sensed current correlates to torque, which is monitored by the hardware and software 306.

The step motor 320 in combination with the coupler 322, lead screw 326, and lead screw nut 330 is one example of a linear drive for raising the lowering the head unit 110 with respect to the base 338/112. Rotation of the lead screw 326 within the lead screw nut 330 moves the lead screw 326 in and out of the cavity within the hollow inner tube 336. In the illustrated example, the lead screw 326 was rotated in a first direction to fully withdraw the lead screw 326 from the cavity within the hollow inner tube 336, which creates a maximum distance between the base 338/112 and the head unit 110 (i.e., the head unit is fully raised). Rotating the lead screw 326 in a second opposite direction lowers the lead screw 326 into the cavity of the hollow inner tube 336, which reduces the distance between the base 338/112 and the head unit 110. The lead screw 326 may be rotated in the second direction until it is fully inserted into the cavity within the hollow inner tube 336, which creates a minimum distance between the base 338/112 and the head unit 110 (i.e., the head unit is fully lowered).

An outer tube 332 encloses a lower portion of a linear bearing 334 that extends between the base 338/112 and the head unit 110 to provide lateral support. As the lead screw 326 is withdrawn from the cavity within the hollow inner tube 336, the linear bearing elongates, and, as the lead screw 326 is inserted into the cavity within the hollow inner tube 336, the linear bearing shortens. A bellow 328 extends between the outer tube 332 and the head unit 110 to enclose the upper portion of the linear bearing 334. In one example, the other support leg includes the same or similar components. In another example, the other support leg is used to provide lateral support only and one or more of the step motor 320, coupling 322, lead screw 326, lead screw nut 330, and inner tube 336 may be omitted.

FIGS. 4-7 depict flow charts 400/500/600/700 of example methods for automatically identifying a surface of a material, lowering a measuring head to a predefined depth, and measuring a rheological property of the material. Although the steps are described with reference to the device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

At block 402 (FIG. 4), a rotational driver rotates the spindle 102 under control of a controller (e.g., software/hardware signal processing 306; FIG. 3A). Initially, the device 100 is in a raised state and the rotational driver rotates the spindle 102 at a defined rate with the measuring head 104 in air above the material surface 120. The controller may monitor the torque applied to the spindle and record the monitored torque as a reference value during a steady state.

At block 404, a linear driver lowers the spindle 102 under control of a controller (e.g., software/hardware signal processing 306; FIG. 3A). The linear driver lowers the spindle 102 such that the measuring head 104 approaches a surface 120 of the material 116.

At block 406, the controller monitors torque applied to the spindle 102 (e.g., via sensor 304; FIG. 3A) and, at block 408, the controller detects engagement of the measuring head 104 with the material 116 in response to detected deviations in the monitored torque. In one example, the controller compares the monitored torque to a predefined trigger value (which may be adjusted responsive to a torque reference value set when the measuring head 104 is in air above the material surface 120 during a steady state as described with reference to block 402).

At block 410, the controller identifies the material surface. In one example, the controller tracks a bottom 206B of the measuring head 104 and identifies the material surface coincident with the bottom 206B of the measuring head 104 at the time the monitored torque reaches the predefined trigger value (see block 408 and description of FIGS. 8A and 8B). In another example, the controller implements an algorithm that, in one example, identifies a steady state reference value (see description of block 402), tracks a bottom 206B of the measuring head 104 and identifies the material surface coincident with the bottom 206B of the measuring head 104 at the time the monitored torque with respect to the steady state reference value reaches the predefined trigger value (see block 408 and description of FIGS. 9A and 9B). In another example, the controller implements a mathematical model that, in one example, identifies a steady state reference value (see description of block 402), tracks a bottom 206B of the measuring head 104, mathematically models changes in torque surrounding the time monitored torque with respect to the steady state reference value reaches the predefined trigger value, and identifies the material surface based on the mathematical model (see block 408 and description of FIGS. 10 and 11).

At block 412, the linear driver lowers the spindle 102 under control of the controller to a predefined depth. The linear driver lowers the spindle 102 such that the measuring head 104 (e.g., measuring head bottom 206B) reaches a predefined depth with respected to the identified material surface (block 410).

At block 414, the rotational driver rotates the spindle 102 under control of the controller while at the predefined depth and, at block 416, the controller gathers torque and/or speed data for measuring one or more rheological properties.

Figure 4:
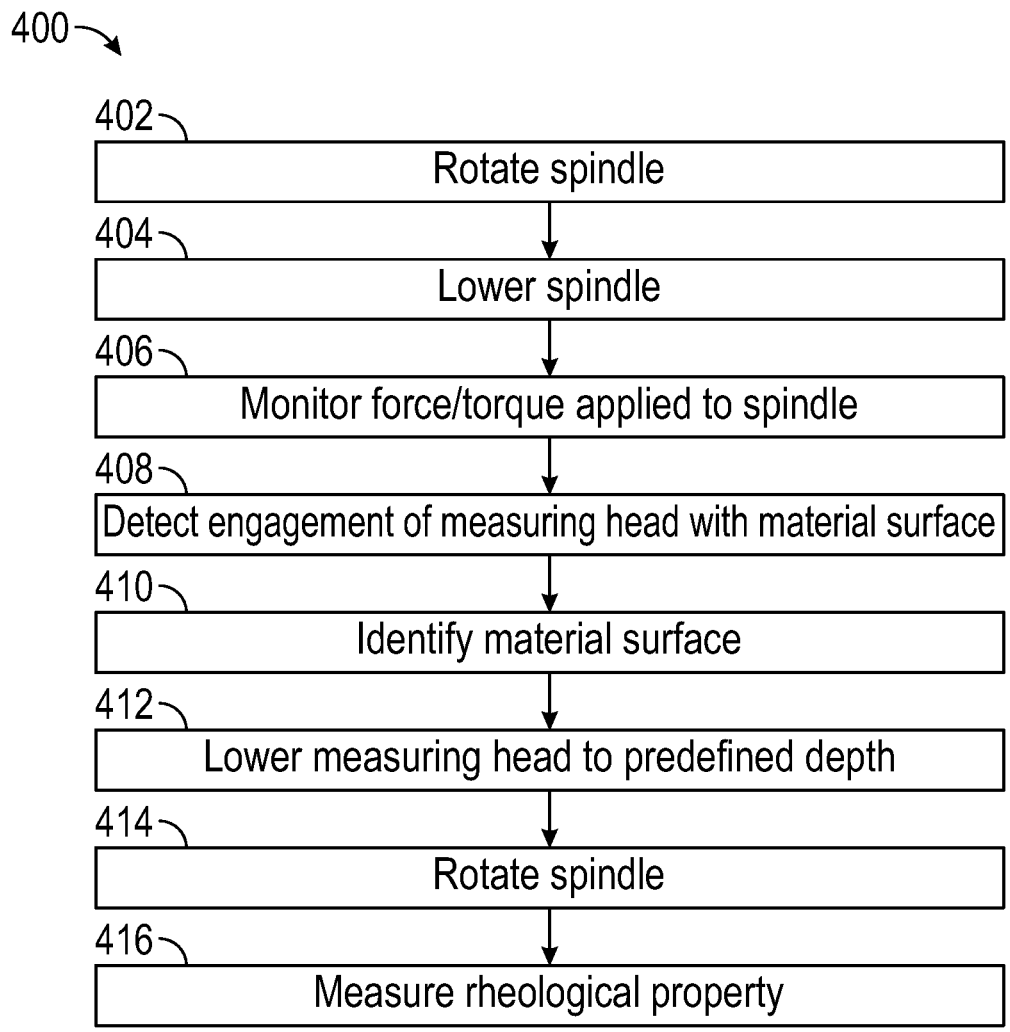
FIGS. 4-7 are a flow charts of example steps for automatically identifying a material surface, lowering a measuring head to a predefined depth with respect to the material surface, and measuring a rheological property.
Figure 5:
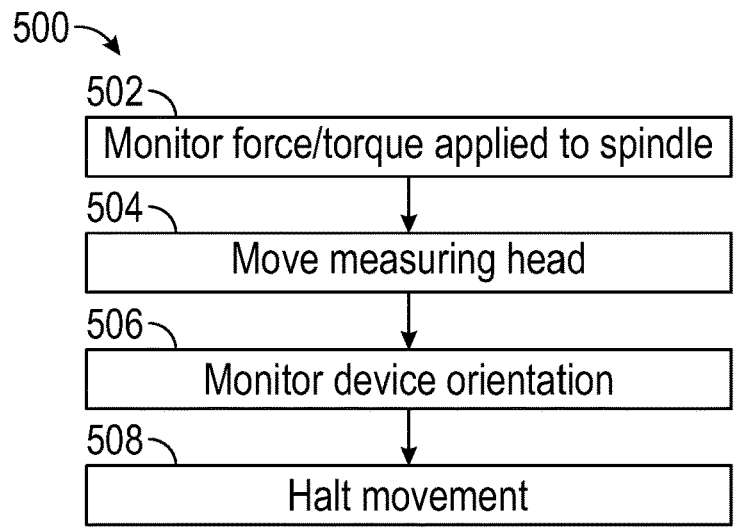
Figure 6:
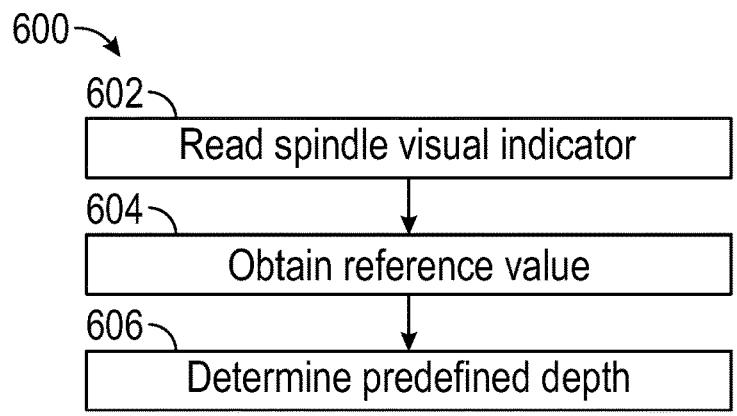
Figure 7:
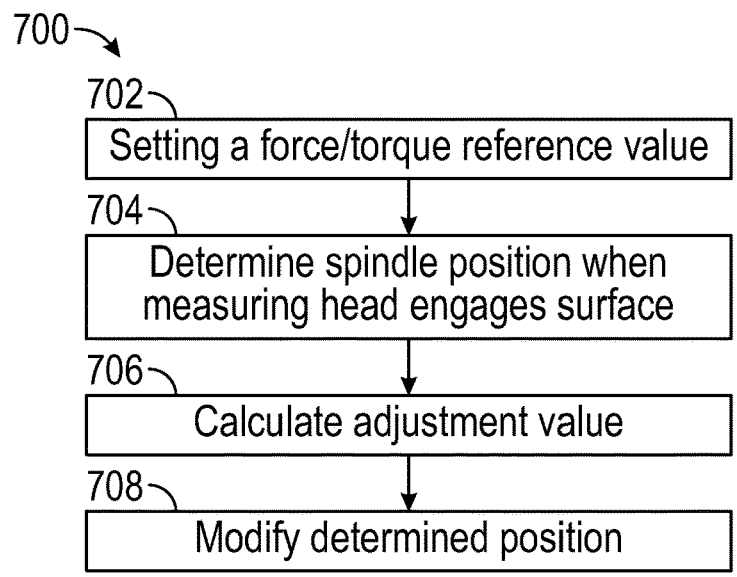

At block 502 (FIG. 5), the controller monitors the torque/speed applied to the spindle during measurement of the one or more rheological properties (e.g., as described with respect to block 406; FIG. 4) and, at block 504, the linear driver axially/linearly moves the spindle 102 (including measuring head 104) under control of a controller (e.g., software/hardware signal processing 306; FIG. 3A). In one example, the controller moves the measuring head up/down at a set rate while measuring rheological properties such that the measuring head encounters new portions of the material 116 as it rotates. In accordance with this example, the cross pin 224 of a T-shaped spindle 220 (FIG. 2B) may be simultaneously rotated and lowered/raised to cut a helical path through a relatively low viscosity material 116 (such as peanut butter) in order for the rheological properties measured upon each rotation to not be affected by movement of the cross pin 224 through the material on a previous pass. The pitch of the helical path (which is set by the rate of rotation, e.g., 10 RPMs, and the speed at which the linear driver axially/linearly moves the spindle 102) may be selected by an operator based on the properties of the material being analyzed such that the cross pin 224 will encounter undisturbed material 116 upon each rotation as it passes through the material 116.

In another example, the controller moves the measuring head in response to detection of resistance (e.g., increased torque when trying to rotate at a constant rate (velocity)) above a threshold to avoid continuously hitting aggregates in the material 116. In another example, the controller retracts and/or halts rotation of the measuring head to avoid damage in response to the torque exceeding another threshold indicating an abnormal measurement condition (e.g., contact of the measurement head with a wall or bottom of a measurement vessel due to, for example, a lower than anticipated level of material in the measurement vessel or other abnormal condition). In accordance with these examples, the controller continuously monitors torque and compares it to predefined threshold values (e.g., one or more values in a look-up table, with each value associated with a designated action such as stop, raise, or stop and raise). When the controller detects the torque exceeding a threshold, the controller may implement the designated action.

At block 506, the controller senses orientation of the device. In one example, the controller monitors an orientation sensor (e.g., a MEMS based 3D-accelerometer in the head unit 110). The controller senses the orientation by comparing an output of the orientation sensor to a threshold value (e.g., level or a rate of change). At block 508, the controller halts lowering of the spindle/measurement geometry when the sensed orientation reaches the threshold value. For example, in the event that the operator sets up the measurement sample incorrectly, or fails to add the sample to the container, it is possible for the head unit 110 to move downward without sensing the sample and stopping at the correct immersion depth. In this case, the spindle could stop against the bottom of the sample container, or some other constraint. The head will continue to move downward. Potentially this could lift the system up, so that it tilts and poses a hazard due to toppling over. To avoid this problem, the orientation sensor detects the orientation [tilt] and stop the downward motion if the angle of the system changes substantially, and/or exceeds a threshold. The downward motion would stop well in advance of the system becoming unstable and posing a hazard.

At block 602, the controller reads an indicator on/in a spindle and, at block 604, the controller obtains a reference value from the indicator. In an example, the controller reads a barcode 210 on a shaft 106 of the spindle 102 with a barcode reader 310 to obtain the reference value.

At block 606, the controller determines the predefined depth. In an example, the reference value is associated with a predefined depth stored in a lookup table. To determine the predefined depth, the controller queries the lookup table using the reference value.

At block 702, the controller sets a torque reference value. In an example, to set the torque reference value, the controller initially rotates the spindle 102 at a constant rate with the device 100 in the raised state. While the device 100 is in the raised state and the spindle 102 is rotating at a constant rate, the controller obtains a torque value and stores the obtained value as a reference value.

At block 704, the controller determines the linear position of the spindle (e.g., the bottom 206B of the measuring head 104) when the measuring head engages the surface (e.g., based on the torque exceeding a value above the torque reference value). In one example, the determined linear position is used as the surface 120 of the material 116. In other examples, further processing such as described with reference to blocks 706 and 708 are performed to obtain a more precise location of the surface 120 of the material 116.

At block 706, the controller calculates an adjustment value. In one example, the adjustment value is a set amount, e.g., 2 millimeters. In another example, the adjustment value is derived based on a mathematical value such as torque slope.

At block 708, the controller modifies the determined position to identify the surface 120 of the material based on the adjustment value.

Figure 8A:
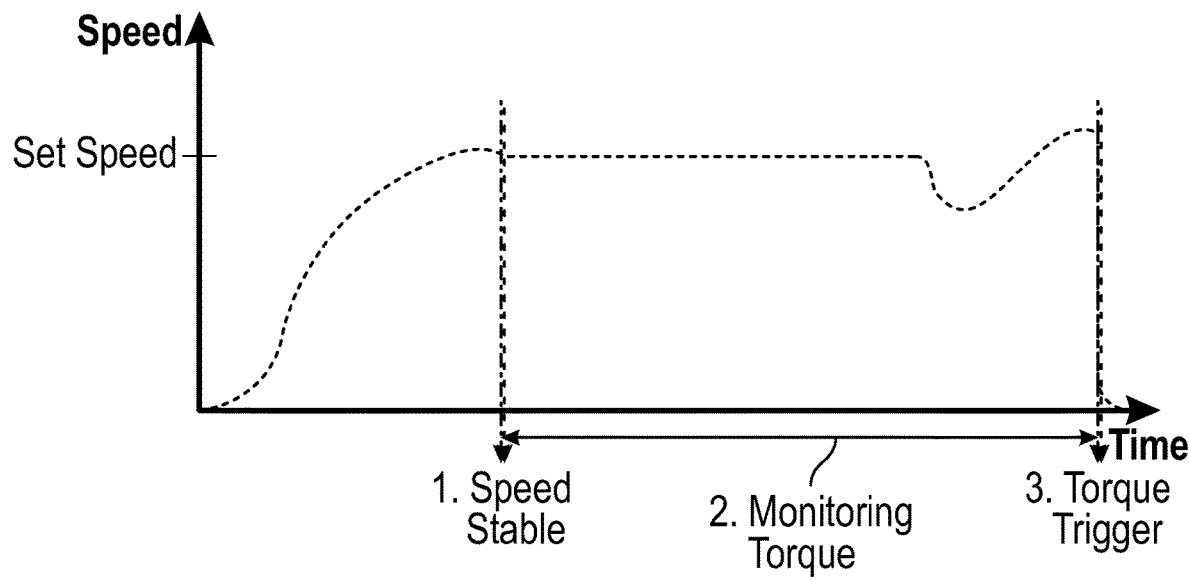
FIGS. 8A and 8B are graphs of time versus spindle rotation speed and torque, respectively, for illustrating one example detection technique.
Figure 8B:
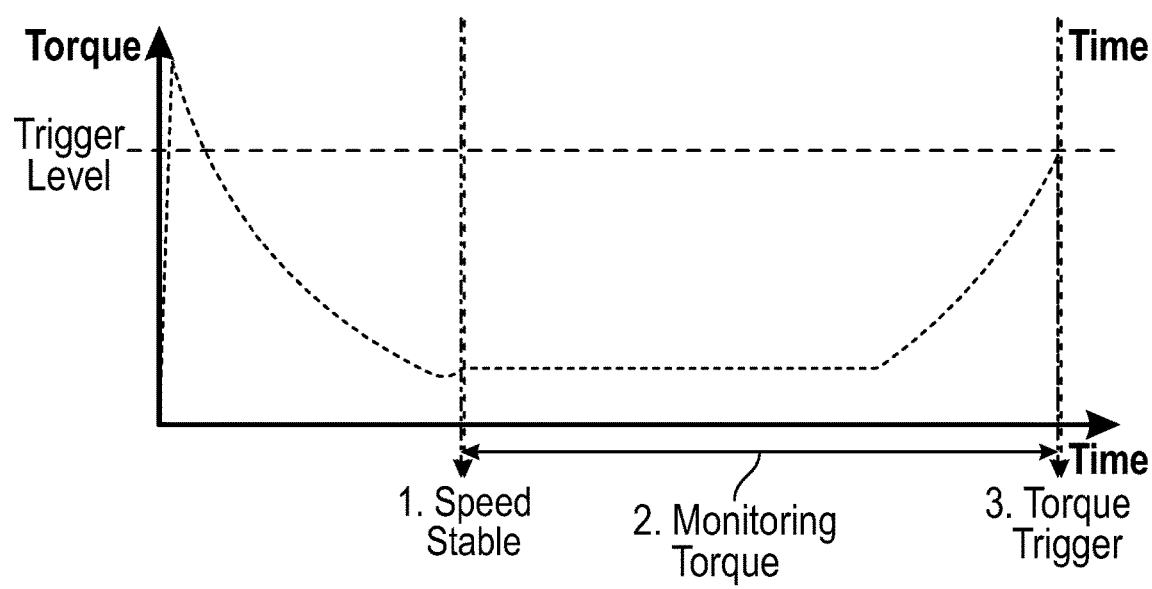

FIGS. 8A and 8B are graphs of time versus spindle rotation speed and torque, respectively, illustrating one example detection technique. The detection technique is given by the following sequence: (1) The mechanical tool will be accelerated by a driving source to a stable set speed, (2) after achieving the stable set speed the torque is monitored, and (3) when the detection geometry of the spindle come in contact with a medium and a defined torque level is exceeded a trigger will be asserted and the rotation or translation will be stopped.

Figure 9A:
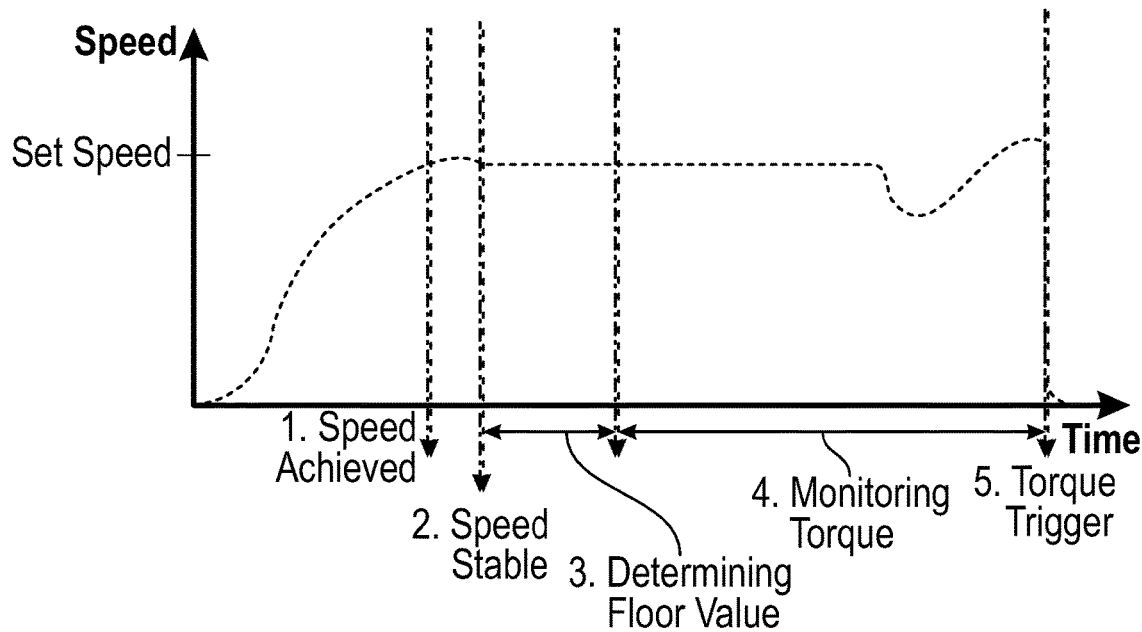
FIGS. 9A and 9B are graphs of time versus spindle rotation speed and torque, respectively, for illustrating another example detection technique.
Figure 9B:
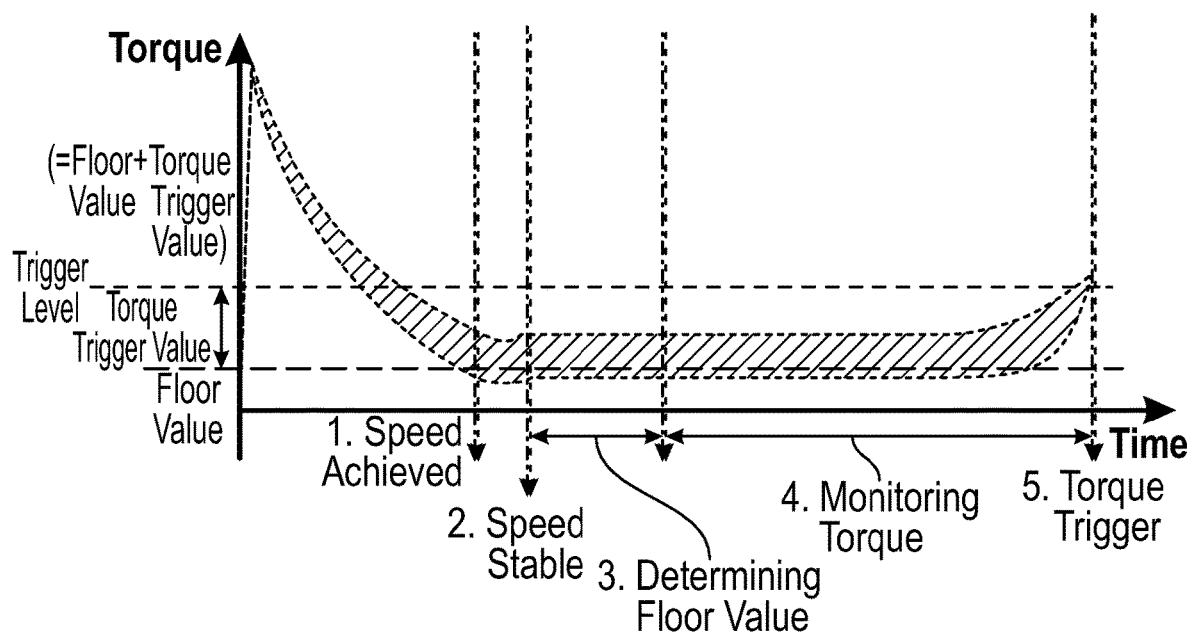

FIGS. 9A and 9B are graphs of time versus spindle rotation speed and torque, respectively, illustrating another example detection technique that implements an algorithm. The algorithm can reflect the simple detection technique or can expanded as follows.

The speed dependent friction torque can be determined and used as a lower limit/floor value for reference. This is useful in compensating for signal noise due to the friction torque. Also, individual tuning to a detection system (detection geometry+driving source) becomes obsolete with this step. In one example, the trigger level is defined based on a trigger value (which may be constant) plus a trigger floor value (which may vary based on the attached spindle). In accordance with this example, the trigger floor value is determined by rotating the attached spindle in air at a set rate and recording a measured value as the trigger floor value. The trigger level is then determined by adding the trigger value to the trigger floor value: Trigger Level=Trigger Value+Trigger Floor Value.

The algorithm process is given by the following sequence: (1) accelerating the motor to the set speed, (2) wait until the speed is stabilizes, (3) determining the floor value for reference, (4) monitoring the torque until the trigger level (=trigger value+floor value) is exceeded. This happens when the measurement geometry comes in contact with a medium, and (5) set trigger and stop rotation or translation.

Figure 10:
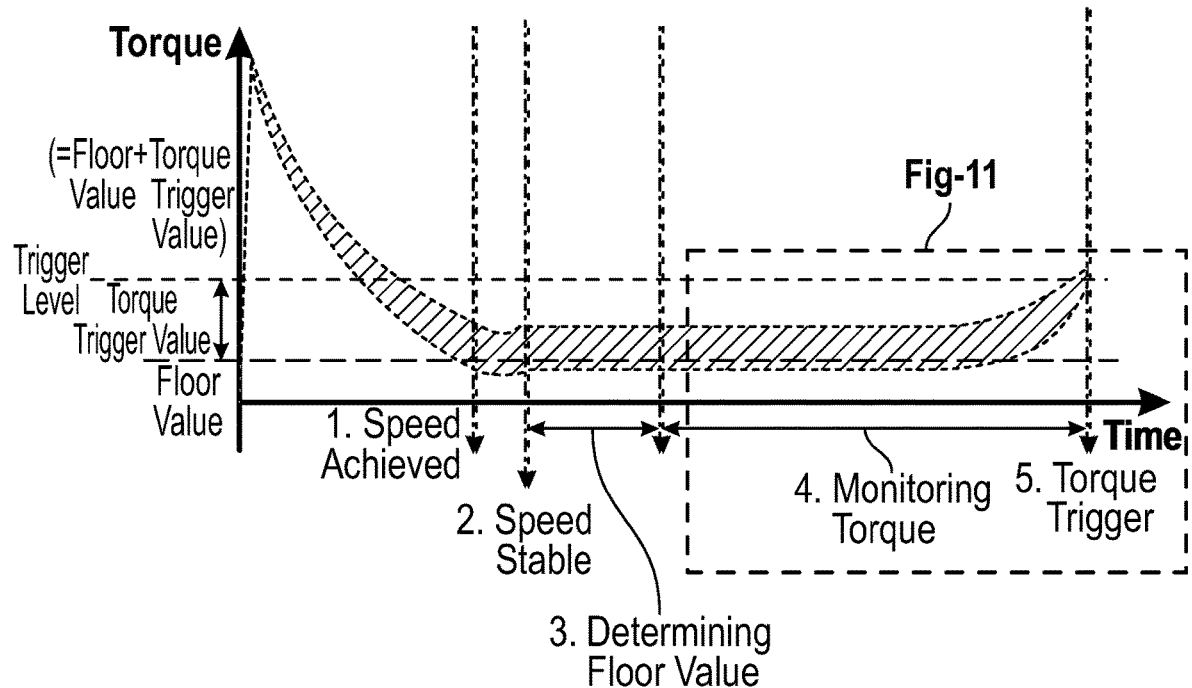
FIG. 10 is a graph of time versus torque for illustrating another example detection technique and FIG. 11 is an exploded view of a portion of the graph of FIG. 10.
Figure 11:
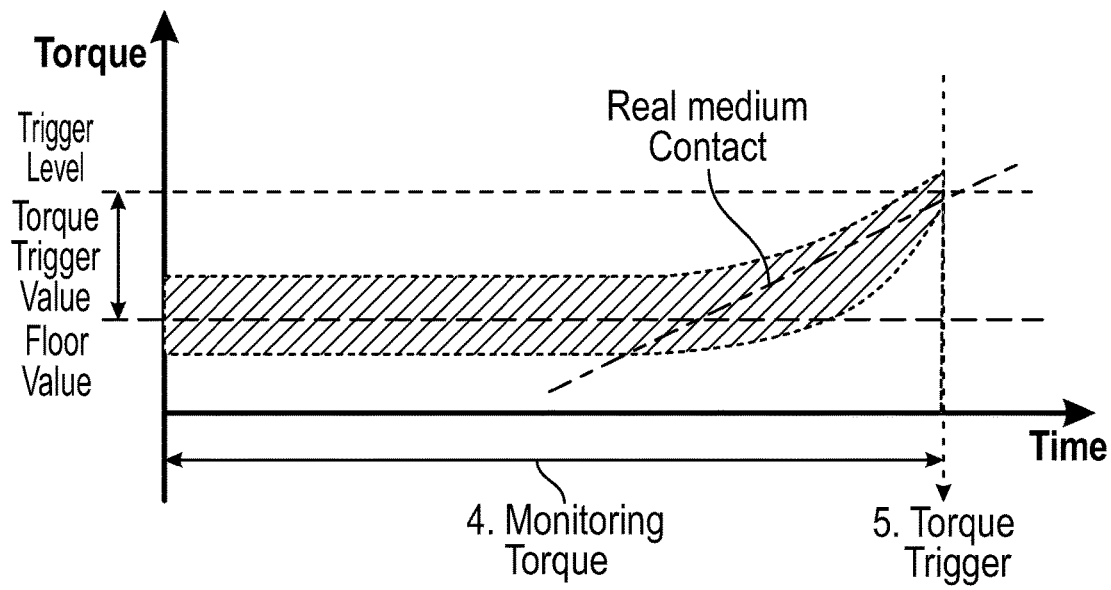

FIG. 10 is a graph of torque versus time in which the monitoring phase is examined during the contact time (FIG. 11), which shows that the contact event trigger is delayed—causing a partial immersion of the detection geometry. The real medium contact point can be recalculated by mathematic modeling methods after the trigger event. This option can be used to calculate the correct position which can be used again to move back the detection tool out of the material.

Figure 12:
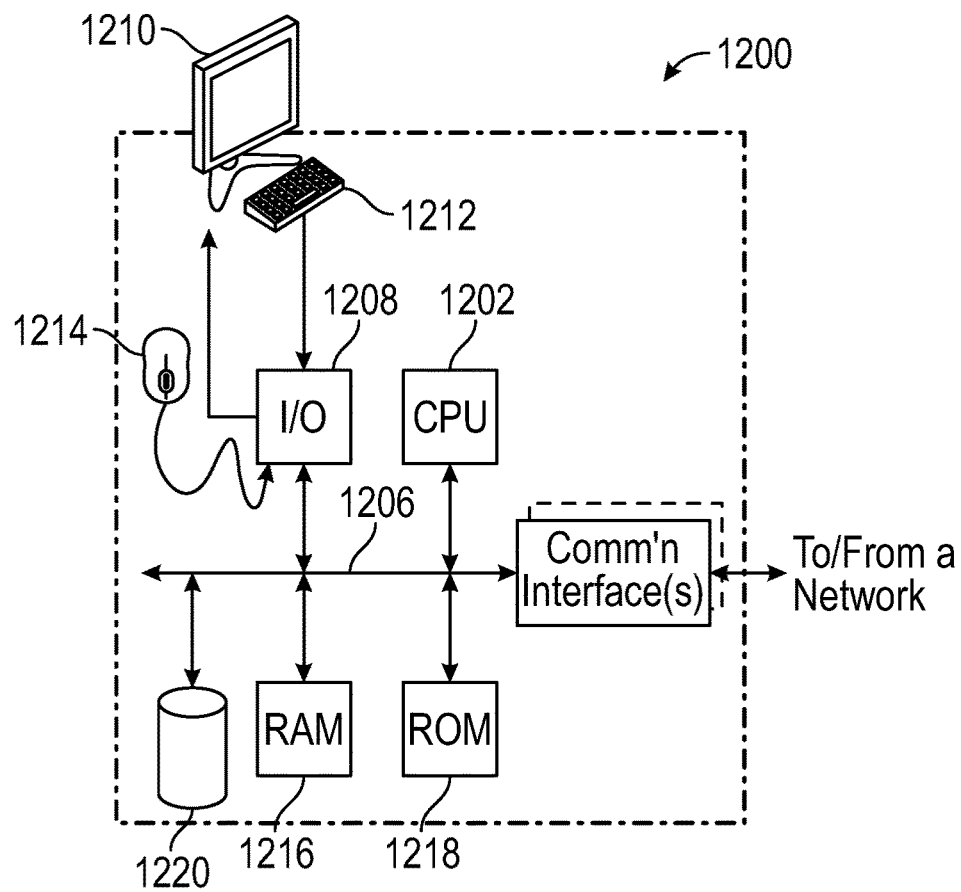
FIG. 12 is a functional block diagram illustrating a general-purpose computer hardware platform configured to implement the functional examples described with respect to FIGS. 1-11.
Figure 13:
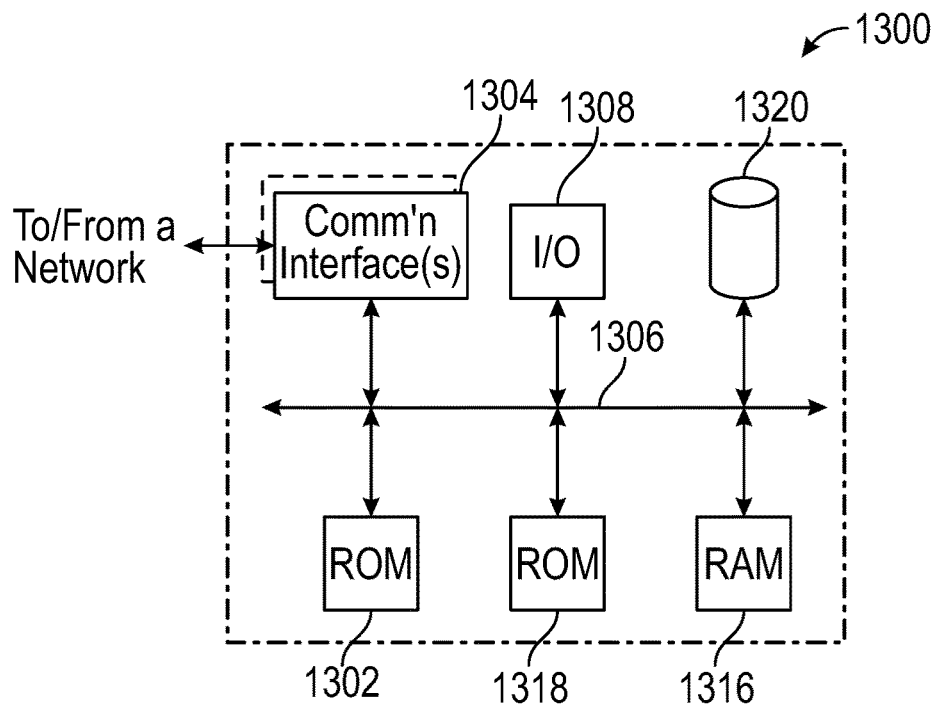
FIG. 13 is another functional block diagram illustrating a general purpose computer hardware platforms configured to implement the functional examples described with respect to FIGS. 1-9.

FIGS. 12 and 13 are functional block diagrams illustrating general-purpose computer hardware platforms configured to implement the functional examples described with respect to FIGS. 1-11 as discussed above.

Specifically, FIG. 12 illustrates an example network or host computer platform 1200, as may be used to implement for implementing a server. Specifically, FIG. 13 depicts an example computer 1300 with user interface elements, as may be used to implement a personal computer or other type of workstation or terminal device, although the computer 1300 of FIG. 13 may also act as a server if appropriately programmed. It is believed that those skilled in the art are familiar with the structure, programming, and general operation of such computer equipment and as a result the drawings should be self-explanatory.

Hardware of an example server computer (FIG. 12) includes a data communication interface for packet data communication. The server computer also includes a central processing unit (CPU) 1202, in the form of circuitry forming one or more processors, for executing program instructions. The server platform hardware typically includes an internal communication bus 1206, program and/or data storage 1216, 1218, and 1220 for various programs and data files to be processed and/or communicated by the server computer, although the server computer often receives programming and data via network communications. In one example, as shown in FIG. 12, the computer system includes a video display unit 1210, (e.g., a liquid crystal display (LCD) or a cathode ray tube (CRT)), an alphanumeric input device 1212 (e.g., a keyboard), a cursor control device 1214 (e.g., a mouse), each of which communicate via an input/output device (I/O) 1208. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface 1304, CPU 1302, main memory 1316 and 1318, one or more mass storage devices 1320 for storing user data and the various executable programs, an internal communication bus 1306, and an input/output device (I/O) 1308 (see FIG. 13).

Aspects of this disclosure, as outlined above, may be embodied in programming in general purpose computer hardware platforms (such as described above with respect to FIGS. 12 and 13), e.g., in the form of software, firmware, or microcode executable by a networked computer system such as a server or gateway, and/or a programmable nodal device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Aspects of the methods of this disclosure, as outlined above, may be embodied in programming in general purpose computer hardware platforms (such as described above with respect to FIGS. 12 and 13), e.g., in the form of software, firmware, or microcode executable by a networked computer system such as a server or gateway, and/or a programmable nodal device. program aspects of the technology may be thought of as "products" or "articles of manufacture" typically in the form of executable code and/or associated data that is carried on or embodied in a type of machine readable medium. "storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. such communications, for example, may enable loading of the software, from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. many of these forms of computer readable media may be involved in carrying one or more sequences of one or more instructions to a processor for execution.

Program instructions may include a software or firmware implementation encoded in any desired language. programming instructions, when embodied in machine readable medium accessible to a processor of a computer system or device, render computer system or device into a special-purpose machine that is customized to perform the operations specified in the program performed by electronics of the measurement device 100.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of sections 101, 102, or 105 of the patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. rather, as the following claims reflect, the subject matter to be protected lies in less than all features of any single disclosed example. Thus, the following claims are hereby incorporated into the Detailed Description, with each claim standing on its own as a separately claimed subject matter.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A device comprising:
    a spindle configured for immersion in a material having a material surface, the spindle having a measuring head;
    a rotational driver configured for attachment to the spindle;
    a sensor coupled to the rotational driver, the sensor positioned to detect torque applied by the rotational driver to the spindle;
    a linear driver coupled to the spindle, the linear driver configured to move the spindle between an upper position in which the measuring head is above the material surface and a lower position in which at least a portion of the measuring head is below the material surface; and
    a controller coupled to the sensor, the rotational driver, and the linear driver, the controller configured to:
        control the rotational driver to rotate the spindle with the measuring head above the material surface;
        control the linear driver to lower the spindle from the upper position toward the lower position;
        monitor the torque via the sensor as the spindle is lowered;
        detect engagement of the measuring head with the material surface responsive to the torque reaching a predefined trigger level;
        identify the material surface based on the detected engagement of the measuring head with the material surface; and
        control the linear driver to lower the spindle to position the measuring head at a predefined depth with respect to the material surface identified by the controller.

2. The device of claim 1, wherein the controller is further configured to:
    control the rotational driver to rotate the spindle with the measuring head at the predefined depth; and
    measure a rheological property of the material with the measuring head as the spindle rotates.

3. The device of claim 2, wherein the controller is further configured to:
    control the linear driver to move the spindle from the predefined depth to another depth while measuring the rheological property.

4. The device of claim 3, wherein the controller is further configured to:
    monitor the torque via the sensor as the rheological property is measured;
    wherein the controller is configured to control the linear driver to move the spindle from the predefined depth to the other depth responsive to the torque monitored via the sensor as the rheological property is measured.

5. The device of claim 1, wherein the spindle includes an indicator representing a reference value corresponding to the predefined depth and the device further comprises:
a reader coupled to the controller, the reader configured to read the indicator to acquire the reference value;
wherein the controller is further configured to:
obtain the reference value from the reader; and
determine the predefined depth from the reference value.

6. The device of claim 1, further comprising:
an orientation sensor configured to sense orientation of the device;
wherein the controller is coupled to the orientation sensor and is further configured to compare the sensed orientation to a threshold and to halt lowering the spindle when the sensed orientation reaches the threshold.

7. The device of claim 1, wherein the controller is further configured to:
set a reference value responsive to the torque monitored via the sensor prior to engagement of the measuring head with the material surface;
wherein the engagement is detected responsive to the torque reaching the predefined trigger level with respect to the reference value.

8. The device of claim 1, wherein to identify the material surface, the controller is configured to:
determine a position of the spindle when the torque reaches the predefined trigger level to detect the engagement of the measuring head with the material surface; and
identify the material surface based on the determined position of the spindle.

9. The device of claim 1, wherein the controller is further configured to:
at least one of retract or halt rotation of the measuring head in response to the torque exceeding another predefined trigger level.

10. A method for measuring at least one property of a material having a material surface, the method comprising:
rotating a spindle having a measuring head with the measuring head above a material surface;
lowering the spindle from an upper position toward a lower position;
monitoring torque corresponding to torque applied to the spindle as the spindle is lowered;
detecting engagement of the measuring head with the material surface responsive to the torque monitored reaching a predefined trigger level as the spindle is lowered;
identifying the material surface based on the detected engagement of the measuring head with the material surface responsive to the torque monitored reaching the predefined trigger level; and
lowering the spindle to position the measuring head at a predefined depth with respect to the material surface identified based on the detected engagement of the measuring head with the material surface.

11. The method of claim 10, further comprising:
rotating the spindle with the measuring head at the predefined depth; and
measuring a rheological property of the material with the measuring head as the spindle rotates.

12. The method of claim 11, further comprising:
moving the spindle from the predefined depth to another depth while measuring the rheological property.

13. The method of claim 12, further comprising:
monitoring the torque as the rheological property is measured;
wherein the moving the spindle from the predefined depth to the other depth is responsive to the torque monitored as the rheological property is measured.

14. The method of claim 10, wherein the spindle includes an indicator representing a reference value corresponding to the predefined depth and the method further comprises:
reading the indicator on the spindle, the indicator representing a reference value corresponding to the predefined depth;
obtaining the reference value from the indicator; and
determining the predefined depth from the reference value.

15. The method of claim 10, further comprising:
setting a reference value responsive to the torque monitored via a sensor prior to engagement of the measuring head with the material surface;
wherein the engagement is detected responsive to the torque reaching the predefined trigger level with respect to the reference value.

16. The method of claim 10, wherein the identifying the material surface comprises:
determining a position of the spindle when the torque reaches the predefined trigger level to detect the engagement of the measuring head with the material surface; and
identifying the material surface based on the determined position of the spindle.

17. The method of claim 10, wherein a device rotates the spindle and wherein the method further comprising:
comparing a sensed orientation of the device to a threshold; and
halting lowering of the spindle when the sensed orientation reaches the threshold.

18. The method of claim 10, further comprising:
at least one of retracting or halting rotation of the measuring head in response to the torque exceeding another predefined trigger level.

19. A non-transitory computer readable medium including instruction for measuring at least one rheological property of a material having a material surface, the instructions, when executed by a controller, configure the controller to:
rotate a spindle via a rotational driver with a measuring head of the spindle above the material surface;
lower the spindle via a linear driver from an upper position toward a lower position;
monitor torque corresponding to torque applied to the spindle as the spindle is lowered;
detect engagement of the measuring head with the material surface responsive to the torque reaching a predefined trigger level;
identify the material surface based on the detected engagement of the measuring head with the material surface;
lower the spindle via the linear driver to position the measuring head at a predefined depth with respect to the material surface identified by the controller;
rotate the spindle via the rotational driver with the measuring head at the predefined depth; and
measure the rheological property of the material with the measuring head as the spindle rotates.

20. The non-transitory computer readable medium of claim 19, wherein the instructions further configure the controller to:

move the spindle via the linear driver from the predefined depth to another depth while measuring the rheological property.

* * * * *